United States Patent [19]
Okawa et al.

[11] Patent Number: 6,133,661
[45] Date of Patent: Oct. 17, 2000

[54] ROTATING ELECTRIC MACHINE USABLE IN RADIOACTIVE ENVIRONMENT

[75] Inventors: Yoshinao Okawa, Ibaraki; Yoshihiro Murano, Chiba; Isao Ito, Ibaraki; Kenichi Okada, Chiba; Kazuo Funabashi; Masanori Miyamoto, both of Ibaraki; Kiyohito Mizuide, Chiba; Yasuhiko Onishi; Masaaki Hoko, both of Mie; Hirotugu Kinoshita, Yokohama; Fumihiro Itano, Yokohama; Makoto Noda, Yokohama; Takeshi Uesugi, Tokyo; Kiyoshi Nagasawa, Aichi; Shuzo Tanigaki, Tokyo; Yoshiyuki Ema, Saitama, all of Japan

[73] Assignees: Kabushiki Kaisha Meidensha; Kandenko Co., Ltd.; Sumitomo Wiring Systems, Ltd.

[21] Appl. No.: 09/187,469

[22] Filed: Nov. 6, 1998

[30] Foreign Application Priority Data

Nov. 6, 1997 [JP] Japan ................................. 9-304045

[51] Int. Cl.[7] .............................. H02K 5/08; H02K 3/30; H02K 5/15; H02K 7/08
[52] U.S. Cl. ............................... 310/90; 310/43; 310/89; 310/85; 508/581; 508/552; 384/476; 384/627; 250/515.1; 376/287; 528/327
[58] Field of Search .................................. 310/85, 88, 89, 310/90, 254, 258, 43; 508/136, 552, 581; 384/627, 476; 250/515.1; 376/287, 288; 528/327, 350; 428/383

[56] References Cited

U.S. PATENT DOCUMENTS

| | | |
|---|---|---|
| 3,266,999 | 8/1966 | Wood et al. .......................... 376/287 |
| 3,716,732 | 2/1973 | Tillma .................................. 310/61 |
| 4,711,732 | 12/1987 | Arakawa et al. ..................... 252/28 |
| 4,753,741 | 6/1988 | Arakawa et al. ..................... 252/25 |
| 4,766,387 | 8/1988 | Browne et al. ....................... 324/545 |
| 4,909,641 | 3/1990 | McKenzie ............................ 384/536 |
| 4,963,434 | 10/1990 | Chen, Sr. et al. .................... 428/378 |
| 5,120,825 | 6/1992 | Vora et al. ........................... 528/350 |
| 5,319,269 | 6/1994 | Bryant ................................. 310/43 |
| 5,410,012 | 4/1995 | Connell et al. ...................... 528/125 |
| 5,569,643 | 10/1996 | Kinoshita et al. ................... 508/155 |
| 5,814,824 | 9/1998 | Hamby et al. ....................... 250/515.1 |
| 5,834,117 | 11/1998 | Onishi .................................. 428/379 |

FOREIGN PATENT DOCUMENTS 9-028065  1/1997  Japan ..................................... 310/211

*Primary Examiner*—Nicholas Ponomarenko
*Assistant Examiner*—Karl Eizo Tamai
*Attorney, Agent, or Firm*—Foley & Lardner

[57] ABSTRACT

The invention relates to a rotating electric machine including a coil of a wire having thereon an insulating coating comprising a polybenzimidazole. This rotating electric machine is stably maintained for a long time in dielectric strength even under a highly radioactive environment, due to the use of the special insulating coating. With this, the rotating electric machine can be driven stably for a long time. The invention further relates to another rotating electric machine including (a) a rotor having a rotating shaft; (b) a bearing for supporting the rotating shaft; and (c) a grease applied to the bearing. This grease contains (1) a polyphenyl ether having at least three aromatic rings in the molecule and (2) a urea. The rotor of this rotating electric machine is stably supported in the bearing for a long time even under a highly radioactive environment, due to the use of the special grease. Thus, this rotating electric machine can also be rotated stably for a long time.

17 Claims, 3 Drawing Sheets

ROTATING ELECTRIC MACHINE USABLE IN RADIOACTIVE ENVIRONMENT

BACKGROUND OF THE INVENTION

The present invention relates to a rotating electric machine usable in radioactive environment, such as nuclear facilities, for example, a nuclear power plant.

Many rotating electric machines are used in nuclear facilities such as a nuclear power plant. Thus, it is important to take preventive measures against radiation in the use of rotating electric machines. For example, it is important to decrease as much as possible deterioration of insulating parts and other parts of a rotating electric machine under radiation.

SUMMARY OF THE INVENTION

It is therefore an object of the present invention to provide a rotating electric machine that is usable under a highly radioactive environment having, for example, about $10^{10}$ rad.

It is a more specific object of the present invention to provide a rotating electric machine that can be driven stably for a long time by stably maintaining the dielectric strength of the rotating electric machine for a long time even under such a highly radioactive environment.

According to a first aspect of the present invention, there is provided a rotating electric machine comprising a coil of a wire having thereon an insulating coating comprising a polybenzimidazole (PBI). Hereinafter, this wire will be referred to as "PBI wire" for simplification. The coil may be a stator coil of the rotating electric machine. This rotating electric machine is stably maintained for a long time, with respect to dielectric strength, even under a highly radioactive environment, due to the use of the above special insulating coating. With this, the rotating electric machine can be driven stably for a long time.

According to a second aspect of the present invention, there is provided a rotating electric machine comprising (a) a rotor having a rotating shaft; (b) a bearing for supporting the rotating shaft; and (c) a grease applied to the bearing. This grease comprises (1) a polyphenyl ether having at least three aromatic rings in the molecule and (2) a urea. This special grease is unexpectedly high in radiation resistance. Thus, the rotor of this rotating electric machine is stably supported in the bearing for a long time even under a highly radioactive environment. With this, the rotating electric machine can be rotated stably for a long time.

Thus, a rotating electric machine according to the present invention is usable under a highly radioactive environment having, for example, about $10^{10}$ rad, such as a nuclear fusion facility, a nuclear fuel cycle facility, or a fast breeder reactor.

DESCRIPTION OF THE PREFERRED EMBODIMENTS

Figure 1:
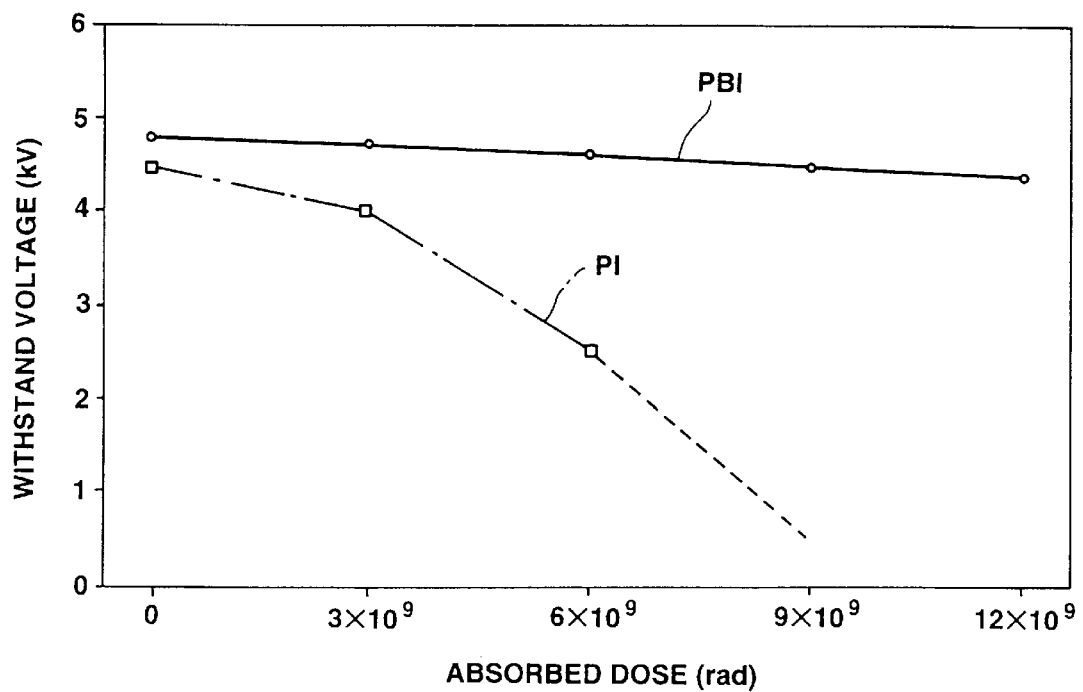
FIG. 1 is a graph showing changes of withstand voltage (kV) of polybenzimidazole (PBI) and polyimide (PI) with radiation absorbed dose (rad)

In the course of the achievement of the present invention, electric wires having thereon respective insulating coatings made of various polymer materials were examined with respect to radiation resistance, in order to find an insulating coating of electric wire that is sufficiently resistant against a highly radioactive environment having, for example, $10^{10}$ rad. With this, as shown in FIG. 1, it was unexpectedly found that a PBI wire is sufficiently high in withstand voltage even under $12 \times 10^9$ rad, and in contrast an electric wire having thereon an insulating coating made of polyimide (hereinafter, referred to as "PI wire") becomes inferior abruptly in withstand voltage if the radiation absorbed dose exceeds $3 \times 10^9$ rad.

Furthermore, in the course of the achievement of the present invention, the following rotating electric machine was designed. This rotating electric machine comprises a stator coil formed by winding the above-mentioned PI wire; an aramid (aromatic polyamide) paper for insulating the stator coil; a laminate of a glass fabric substrate and a silicone resin, which laminate is used as an insulating wedge for insulating the stator coil; a glass sleeve for covering a connection between a lead, which lead is a silicone rubber insulated wire reinforced with a fiber glass braid, and the PI wire of the stator coil; a glass braid for fixedly tying up each connection; a polyimide varnish for insulating the stator coil; and a special inorganic radiation-resistant grease applied to the bearings (deep groove ball bearings). The materials for preparing other parts of this rotating electric machine may be the same as those of the after-mentioned rotating electric machine according to the first embodiment of the invention. The above materials, used in this rotating electric machine, are as follows with respect to their radiation resistance. The PI wire, the aramid paper, the laminate and the polyimide varnish each can be resistant against only a dose of up to $10^9$ rad. Both the glass sleeve and the glass braid, which are inorganic insulations, are very good in radiation resistance. The silicone rubber insulated wire can be resistant against only a dose of up to $10^9$ rad. The special inorganic radiation-resistant grease can be resistant against only a dose up to $4.5 \times 10^8$ rad. An example of this grease is a mixture of polyphenyl ether (base component) and bentonite. If this silicone rubber insulated wire is not reinforced with a fiber glass braid, it can be resistant against only a dose up to $6 \times 10^7$ rad. Therefore, this rotating electric machine may not be usable under a highly radioactive environment having, for example, about $10^{10}$ rad. In view of this, a rotating electric machine according to the present invention, which is usable under such as highly radioactive environment, was designed and will be described in detail in the following.

In the invention, it is preferable that the PBI used as the insulating coating comprises a first structural unit represented by the following general formula (1):

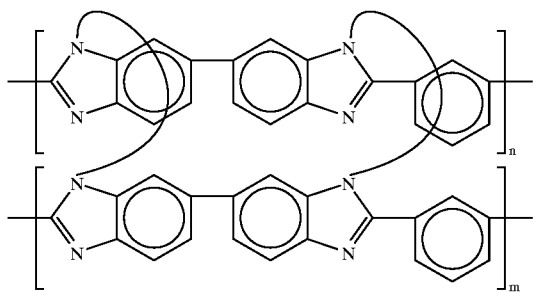

(1)

where each of n and m is an integer of at least 5. The first structural unit of the PBI is formed by a cross-link between a second structural unit represented by the following general formula (2) and a third structural unit represented by the following general formula (3):

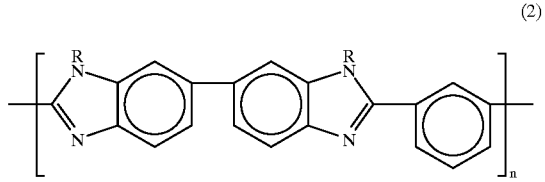

(2)

where R is hydrogen atom or a $C_1$–$C_4$ alkyl group, and n is defined as above,

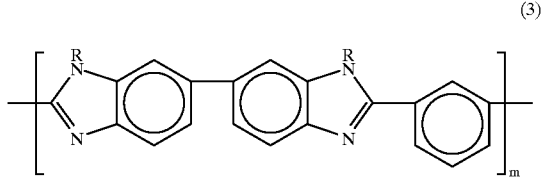

(3)

where R and m are defined as above.

In the invention, as stated above, a special grease may be applied to the bearing for supporting the rotating shaft of the rotating electric machine. This grease comprises (1) a polyphenyl ether having at least three aromatic rings in the molecule and (2) a urea. It is particularly preferable that this urea is a diurea having an aromatic hydrocarbon group in the middle of the molecule and terminated with an aromatic or alicyclic hydrocarbon group. The polyphenyl ether is a base component of the grease, and the urea is a thickener of the grease.

In the invention, a rotating electric machine may comprise a shield layer for shielding a grease applied to the bearing for supporting the rotating shaft, from radiation. This shield layer is made of lead and surrounds the bearing. The grease used in this rotating electric machine may a special inorganic radiation-resisting grease or the above-mentioned special grease containing polyphenyl ether and urea.

Figure 2:
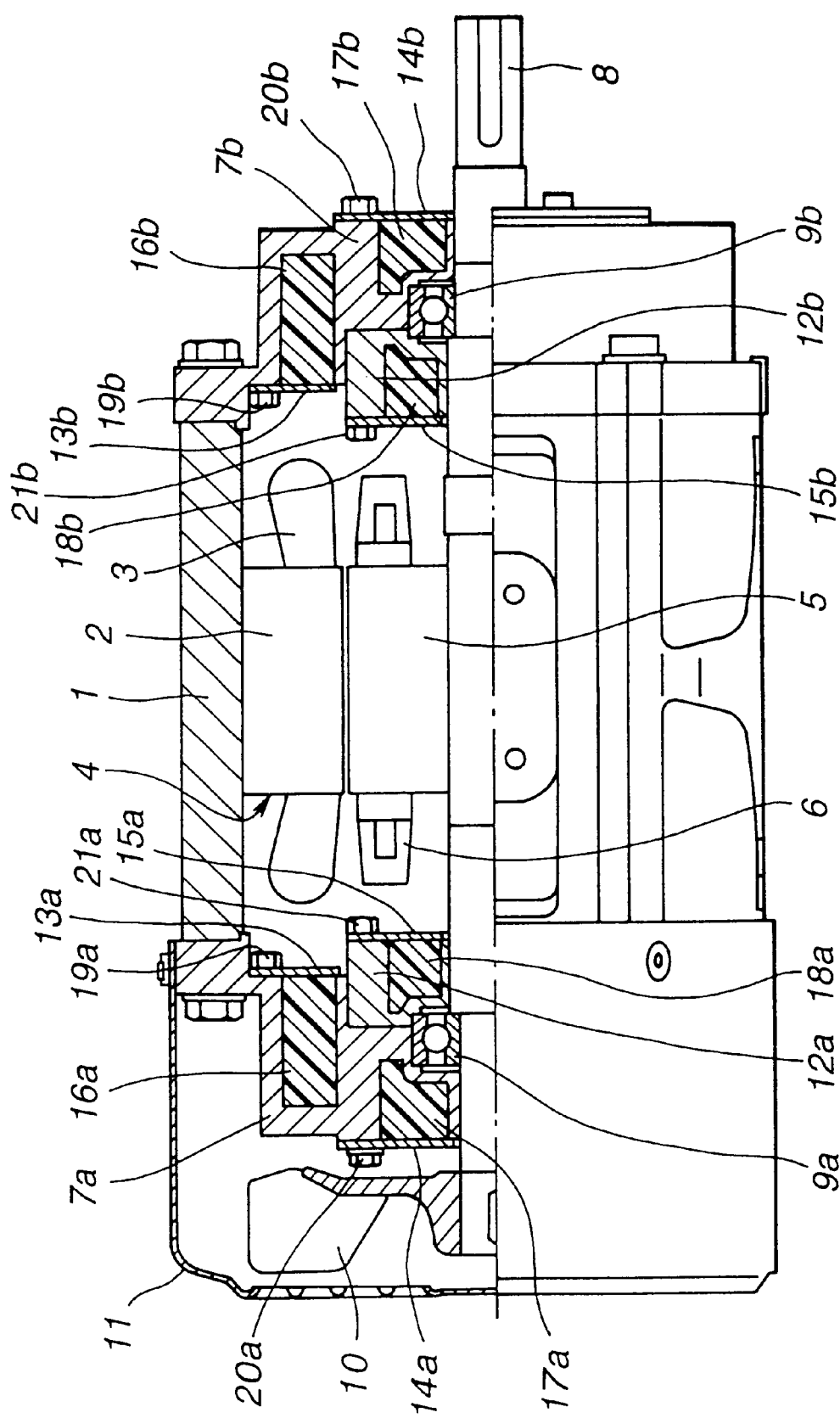
FIG. 2 is a partially sectioned front view of a rotating electric machine according to the present invention.

FIG. 2 shows a rotating electric machine (three-phase induction motor) according to the present invention. This motor has a stator 4 fixed to the inner surface of a cylindrical frame 1. This stator 4 has a stator core 2 and a stator coil 3 mounted on the stator core 2. The stator coil 3 is formed by winding the above-mentioned PBI wire. Due to the use of the PBI wire, the stator coil 3 becomes sufficiently resistant against a highly radioactive environment having, for example, $10^{10}$ rad.

Figure 3:
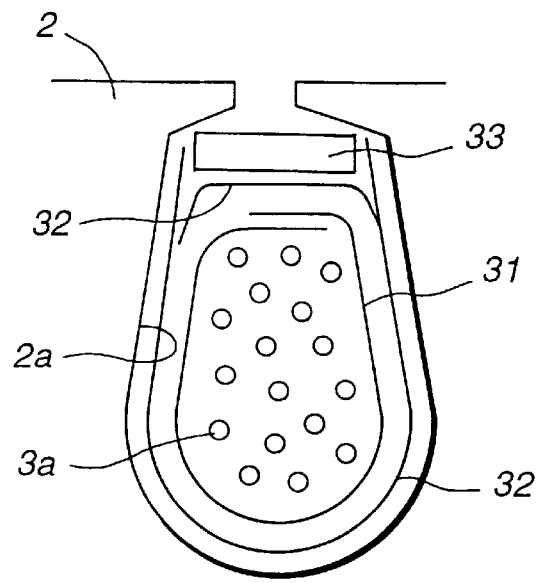
FIG. 3 is an enlarged fragmentary cross sectional view showing a part of a stator coil of the rotating electric machine, which is held in a slot (groove) of a stator core thereof.

As shown in FIG. 3, the PBI wire 3a of the stator coil 3 is received in a slot (groove) 2a of the stator core 2. As the insulation to the earth, a VECRUS (trade name) paper 31, where VECRUS is a trade name of KURARAY CO., LTD., and an aluminum ink coated VECRUS paper 32 are disposed in the slot 2a in a manner to cover the PBI wire 3a, as illustrated. Furthermore, a VECTRA (trade name) board 33, where VECTRA is an aromatic polyester resin of Hoechst celanese, is disposed in the slot 2a to close an opening of the slot 2a.

Figure 4:
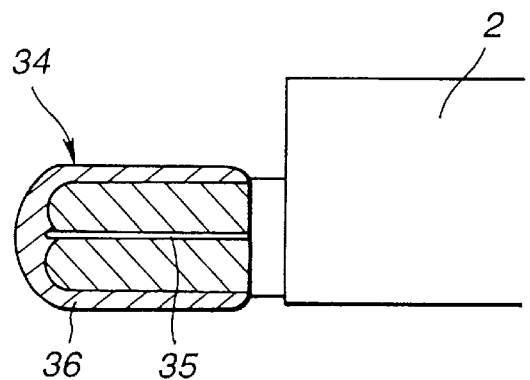
FIG. 4 is an enlarged fragmentary diagrammatic view showing a coil end portion of the rotating electric machine.
Figure 5:
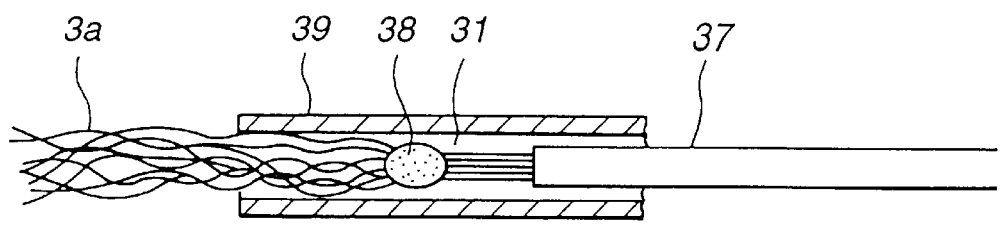
FIG. 5 is an enlarged fragmentary diagrammatic view showing a connection between the stator coil wire and a lead wire in accordance with the present invention.

The stator coil 3 may be prepared by a method comprising the following sequential steps (1)–(8):

(1) winding certain predetermined times the PBI wire 3a around a certain predetermined winding pattern, thereby to prepare a coil, wherein the both end portions of the PBI wire 3a are passed through sleeves 39, each of which sleeve is made of, for example, silicon nitride or glass (see FIG. 5);

(2) disposing a VECRUS paper 31 and an aluminum ink coated VECRUS paper 32 in the slot 2a of the stator coil 3, thereby to provide the insulation to the earth, then inserting the coil of the PBI wire 3a into the slot 2a, then closing the both ends of the VECRUS paper 31, as illustrated in FIG. 3, then disposing another aluminum ink coated VECRUS paper 32 to fully cover the PBI wire 3a, and then inserting a VECTRA board 33 into the slot 2a to close the slot 2a;

(3) inserting an insulating paper (VECRUS paper) 35 into a coil end portion 34, as shown in FIG. 4, such that the insulating paper 35 is interposed between one coil and an adjacent coil;

(4) connecting lead wires 37, each being a strand of the PBI wire, with the both ends of the PBI wire 3a by soldering with silver solder 38, as shown in FIG. 5, and then converting the resultant connections with VECRUS paper 31 and then the sleeves 39 of the step (1), wherein the coils are also connected with each other by soldering with silver solder, then each of the resultant connections is covered with a VECRUS paper and then a sleeve, and wherein each connection is fixedly tied up by a silicon nitride or glass braid at the same time when the coil end portion 34 is fixedly tied up;

(5) taping the entirety of the coil end portions 34 of all the coils with a glass or silicon nitride tape 36, as shown in FIG. 4;

(6) aerially impregnating the entirety of the stator coil 3 together with each connection, with a varnish (silicone resin varnish), followed by heating to harden the varnish;

(7) subjecting the stator coil 3 to an insulating or electrostatic coating, wherein a silicone resin based aluminum paint is used as the insulating paint; and (8) aerially impregnating again the stator coil 3 together with each connection, with the varnish, followed by heating to harden the varnish.

As is seen from FIG. 2, the rotating electric machine has brackets 7a, 7b, which are fixed to the both ends of the frame 1 in a manner to close the both openings of the frame 1. Each of these brackets 7a, 7b serves as an outer lid of the rotating electric machine. A rotor core 5, having thereon a secondary conductor 6, is rotatably supported in bearings 9a, 9b at a rotating shaft 8, as illustrated. The rotor core 5 is disposed in an inner space defined by the stator 4, as illustrated. The bearings 9a, 9b are held by the respective brackets 7a, 7b, 12a, 12b, to support the rotating shaft 8 at predetermined positions, as shown in FIG. 2. A fan 10 is fixed to an end portion of the rotating shaft 8 and thus rotatable together with the rotating shaft 8. An outer cover 11 is fixed to the frame 1 in a manner to cover the fan 10 and the bracket 7a.

In the invention, as stated above, it is optional to provide a shield layer, made of lead, for shielding a grease from radiation in a manner to surround the bearings 9a, 9b, as shown in FIG. 2. In fact, this grease is applied to the bearings 9a, 9b. Herein, the shield layer may be defined as being a combination of first cylindrical shield members 16a, 16b and second and third disk shield members 17a, 16b, 18a, 18b (see FIG. 2). Alternatively, the shield layer may be one-piece in construction. The shield layer is arranged, as shown in FIG. 2, to substantially fully surround the bearings 9a, 9b. Therefore, the bearings 9a, 9b are shielded from radiations in substantially all directions. In fact, the bearings 9a, 9b are shielded by the cylindrical shield members 16a, 16b from a first radiation that is in a direction substantially perpendicular to the axis of the rotating shaft 8. The second and third disk shield members 17a, 18a, 18b, 18b are positioned to interpose therebetween the bearings 9a, 9b in a direction along the axis of the rotating shaft 8. With this, the bearings 9a, 9b are shielded from a second radiation that is in a direction substantially along the axis of the rotating shaft 8. Furthermore, the first, second and third shield members are positioned close to each other, as shown in FIG. 2, such that the bearings 9a, 9b are shielded from radiations in substantially all directions. Each of the first, second and third shield members is positioned about the rotating shaft 8 and has a central void space which the rotating shaft 8 passes through. The brackets 7a, 7b have cavities in which the first and second shield members 16a, 16b, 17a, 17b are fitted, respectively. The brackets 12a, 12b have cavities for receiving therein the third shield members 18a, 18b, respectively. The first shield members 16a, 16b are held in the respective cavities of the brackets 7a, 7b by fixing plates 13a, 13b to the brackets 7a, 7b with bolts 19a, 19b, respectively. Similarly, the second shield members 17a, 17b are held in the respective cavities of the brackets 7a, 7b by fixing plates 14a, 14b to the brackets 7a, 7b with bolts 20a, 20b, respectively. The third shield members 18a, 18b are held in the respective cavities of the brackets 12a, 12b by fixing plates 15a, 15b to the brackets 12a, 12b with bolts 21a, 21b, respectively. It is preferable to use stainless steel, due to its high radiation resistivity, as a material for producing the plates 13a, 13b, 14a, 14b, 15a, 15b and the bolts 19a, 19b, 20a, 20b, 21a, 21b. Herein, these plates are referred to as "a holding member", too. The material for producing these plates and bolts is, however, not limited to stainless steel. In fact, a common steel other than stainless steel or aluminum may be used thereas. Alternatively, the first, second and third shield members may be prepared by pouring a molten lead into the first, second and third cavities of the brackets 7a, 7b, 12a, 12b and then by hardening the molten lead therein. In this case, it becomes possible to omit the above-mentioned plates and bolts. Due the the provision of the shield members, the grease applied to the bearings 9a, 9b becomes sufficiently long in lifetime. Thus, the rotor 5 can stably be rotated for a long time. The shielding effect of the shield layer varies depending on the thickness of the same. In fact, the radiation can be decreased by a factor of about 10 by the provision of a shield member having a thickness of 15 mm. Thus, according to need, the thickness of the shield member(s) can be changed.

A rotating electric machine according to the present invention is not limited to a three-phase induction motor and can be any type of rotating electric machines. If the rotor also has a coil of wire, it is preferable to use the above-mentioned PBI wire as an insulating coating of this coil.

In the following, rotating electric machines according to first to fourth embodiments of the present invention will be described. In each of these embodiments, materials for some parts of the rotating electric machine are specified such that the rotating electric machine can stably be driven for a long time under a highly radioactive environment having, for example, $10^{10}$ rad. In other words, the rotating electric machines according to the first to fourth embodiments of the present invention may have constructions that are the same as those described hereinabove, in addition to the following specified materials.

A rotating electric machine according to the first embodiment comprises a stator coil 3 formed by winding the above-mentioned PBI wire; an aluminum ink coated VECRUS paper 32 for insulating the stator coil 3; a VECTRA board 33 for insulating the stator coil 3; a silicon nitride sleeve 39 for covering a connection between a lead 37, which is a strand of the PBI wires, and the PBI wire of the stator coil 3; a silicon nitride braid for fixedly tying up each connection; a silicon resin based aluminum paint for insulating the stator coil 3; and the above-mentioned special grease (polyphenyl ether/urea) applied to the bearings 9a, 9b (e.g., deep groove ball bearings). This rotating electric machine of the first embodiment may further comprise a frame 1 made of gray cast iron; a stator core 2 made of silicon steel plate; a rotor core 5 made of silicon steel plate; a secondary conductor 6 made of die-cast aluminum; brackets 7a, 7b made of gray cast iron; a rotating shaft 8 made of a carbon steel used for producing mechanical structures; a fan 10 that is an aluminum alloy cast; and an outer cover 11 made of cold-rolled steel. The special grease (polyphenyl ether/urea) is resistant against, for example, $10^{10}$ rad. With this, the rotor 5 can be rotated stably and smoothly for a long time in a highly radioactive environment. Thus, is is not essential in the first embodiment to provide the above-mentioned shield layer for shielding the bearings 9a, 9b.

A rotating electric machine according to the second embodiment of the present invention is the same as that of the first embodiment except in that a glass sleeve is used in place of the silicon nitride sleeve, and that a glass braid is used in place of the silicon nitride braid. Due to the same reason as that of the first embodiment, it is not essential in the second embodiment to provide the shield layer for shielding the bearings 9a, 9b.

A rotating electric machine according to the third embodiment of the present invention is the same as that of the first embodiment except in that a special inorganic radiation-resistant grease is used in place of the special grease of the first embodiment.

A rotating electric machine according to the fourth embodiment of the present invention is the same as that of the first embodiment except in that a glass sleeve is used in place of the silicon nitride sleeve, that a glass braid is used in place of the silicon nitride braid, and that a special inorganic radiation-resistant grease is used in place of the special grease of the first embodiment.

The entire disclosure of Japanese Patent Application No. 9-304045 filed on Nov. 6, 1997, including specification, claims, drawings and summary, is incorporated herein by reference in its entirety.

What is claimed is:

1. A rotating electric machine comprising a coil of a wire having thereon an insulating coating comprising a polybenzimidazole comprising a first structural unit represented by the general formula (1), said first structural unit being formed by a cross-link between a second structural unit represented by the general formula (2) and a third structural unit represented by the general formula (3),

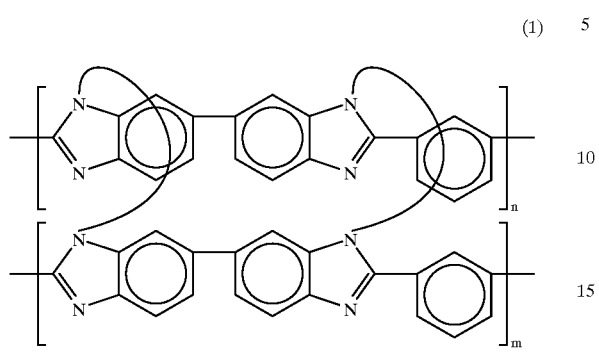
(1)

where each of n and m is an integer of at least 5,

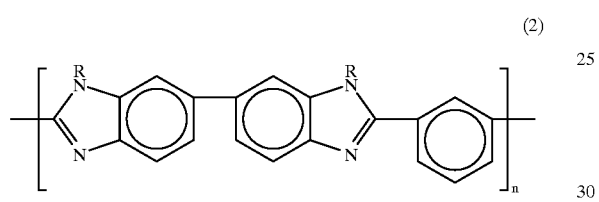
(2)

where R is hydrogen atom or a $C_1$–$C_4$ alkyl group, and n is defined as above,

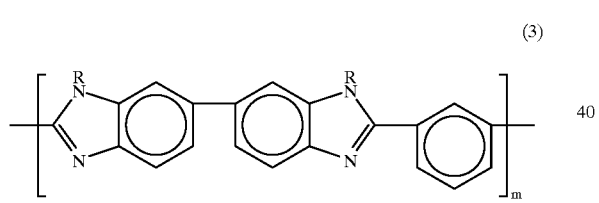
(3)

where R and m are defined as above.

2. A machine according to claim 1, which is a three-phase induction motor.

3. A rotating electric machine comprising:

(a) a rotor having a rotating shaft;

(b) a bearing for supporting said rotating shaft;

(c) a grease applied to said bearing, said grease comprising a polyphenyl ether and a urea; and (d) a coil of a wire having thereon an insulating coating comprising a polybenzimidazole, the polybenzimidazole comprising a first structural unit represented by the general formula (1), said first structural unit being formed by a cross-link between a second structural unit represented by the general formula (2) and a third structural unit represented by the general formula (3),

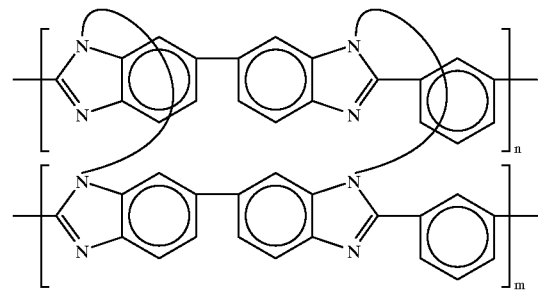
(1)

where each of n and m is an integer of at least 5,

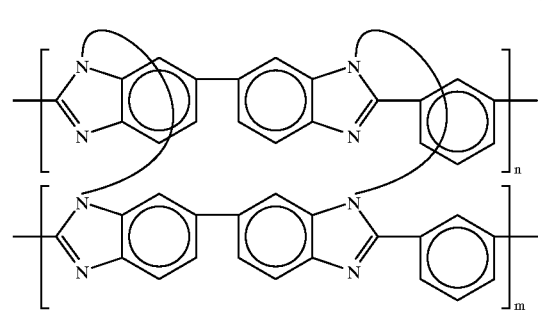
(1)

where R is hydrogen atom or a $C_1$–$C_4$ alkyl group, and n is defined as above,

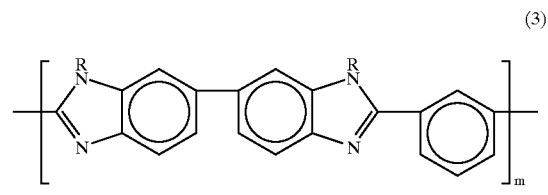
(3)

where R and m are defined as above.

4. A machine according to claim 3, wherein said urea is a diurea having an aromatic hydrocarbon group in a middle of the molecule and terminated with an aromatic or alicyclic hydrocarbon group.

5. A machine according to claim 3, wherein said coil is a stator coil, which is stationary relative to said rotor.

6. A rotating electric machine comprising:

(a) a rotor having a rotating shaft;

(b) a bearing for supporting said rotating shift;

(c) a grease applied to said bearing;

(d) a shield layer for shielding said grease from radiation, said shield layer being made of lead and surrounding said bearing; and (e) a coil of a wire having thereon an insulating coating comprising a polybenzimidazole, the polybenzimidazole comprising a first structural unit represented by the general formula (1), said first structural unit being formed by a cross-link between a second structural unit represented by the general formula (2) and a third structural unit represented by the general formula (3),

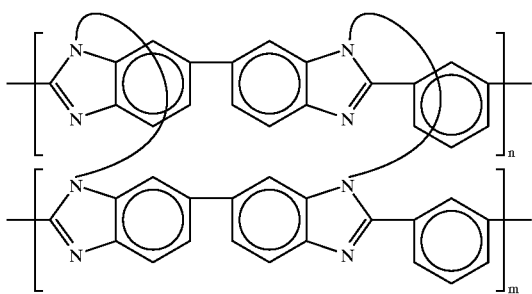

where each of n and m is an integer of at least 5,

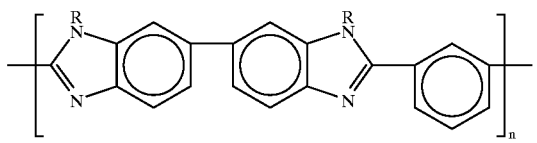

where R is hydrogen atom or a $C_1$–$C_4$ alkyl group, and n is defined as above,

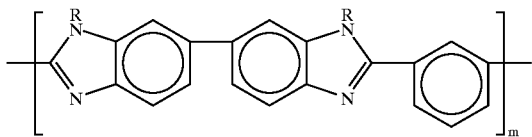

where R and m are defined as above.

7. A machine according to claim 6, wherein said grease is a special inorganic radiation-resistant grease.

8. A machine according to claim 6, wherein said grease comprises a polyphenyl ether and a urea.

9. A machine according to claim 6, wherein said shield layer has a configuration such that said bearing is substantially fully surrounded by the shield layer.

10. A rotating electric machine comprising:
(a) a rotor having a rotating shaft;
(b) a bearing for supporting said rotating shift;
(c) a grease applied to said bearing;
(d) a shield layer for shielding said grease from radiation, said shield layer being made of lead and surrounding said bearing; and
(e) a coil of a wire having thereon an insulating coating comprising a polybenzimidazole, wherein said shield layer comprises (1) a first cylindrical shield member that is positioned to cover said bearing, such that said bearing is shielded from a first radiation that is in a direction substantially perpendicular to an axis of said rotating shaft, and (2) second and third disk shield members that are positioned to interpose therebetween said bearing in a direction along said axis of said rotating shaft, such that said bearing is shielded from a second radiation that is in a direction substantially along said axis of said rotating shaft.

11. A machine according to claim 10, wherein each of said first, second and third shield members is positioned about said rotating shaft and has a central void space which said rotating shaft passes through.

12. A machine according to claim 10, further comprising a bracket for supporting said bearing at a position, said bracket having first, second and third cavities that respectively receive said first, second and third shield members.

13. A machine according to claim 12, further comprising a holding member for holding said first, second and third shield members in said first, second and third cavities of said bracket, respectively.

14. A machine according to claim 13, wherein said holding member is made of stainless steel.

15. A machine according to claim 13, wherein said holding member is secured to said bracket by a bolt.

16. A machine according to claim 15, wherein said bolt is made of stainless steel.

17. A machine according to claim 12, wherein said first, second and third shield members are prepared by pouring a molten lead into said first, second and third cavities of said bracket and then by hardening said molten lead therein.

* * * * *